Oct. 11, 1955  K. A. BROWNE ET AL  2,720,431
JOURNAL BEARING

Filed March 27, 1952  2 Sheets-Sheet 1

INVENTORS.
KENNETH A. BROWNE
SERGEI G. GUINS
BY
Bosworth & Sessions
ATTORNEYS.

Oct. 11, 1955 K. A. BROWNE ET AL 2,720,431
JOURNAL BEARING
Filed March 27, 1952 2 Sheets-Sheet 2

INVENTORS.
KENNETH A. BROWNE
SERGEI G. GUINS
BY
Bosworth + Sessions
ATTORNEYS.

United States Patent Office 2,720,431
Patented Oct. 11, 1955

2,720,431
JOURNAL BEARING

Kenneth A. Browne, Lakewood, and Sergei G. Guins, Olmsted Falls, Ohio, assignors to The Chesapeake and Ohio Railway Company, Cleveland, Ohio, a corporation of Virginia Application March 27, 1952, Serial No. 278,878

7 Claims. (Cl. 308—83)

This invention relates to axle bearings and in particular to journal bearings for railway rolling stock.

One of the chief maintenance problems that has confronted the railroad industry for many years has been that of properly lubricating journal bearings to keep them operating effectively. The conventional method of lubricating journal bearings is by means of oil-soaked waste; such bearings are not adequately sealed and require frequent inspection and replenishing of the lubricant. The labor required by the inspection and service of the bearings is costly and failure to maintain the bearings properly can result in serious damage, even to the extent of causing a train wreck.

A general object of the present invention is to provide a completely enclosed journal bearing assembly for railway rolling stock which overcomes the difficulties and disadvantages of present journal lubricators. Another object of our invention is to provide a bearing assembly which can be used on present standard equipment, with only a minimum of modification being required. Another object is to provide a bearing assembly which is completely and effectively sealed against the loss of lubricant and the ingress of water, dirt and other foreign matter. A further object is to provide a bearing assembly which accomplishes complete and effective lubrication of the parts and eliminates the need for frequent inspection, oiling and packing of journal boxes and generally promotes longer bearing life. A more specific object of our invention is to provide a sealed bearing assembly in which the seal rides directly on the smooth surface of the journal proper.

Figure 1:
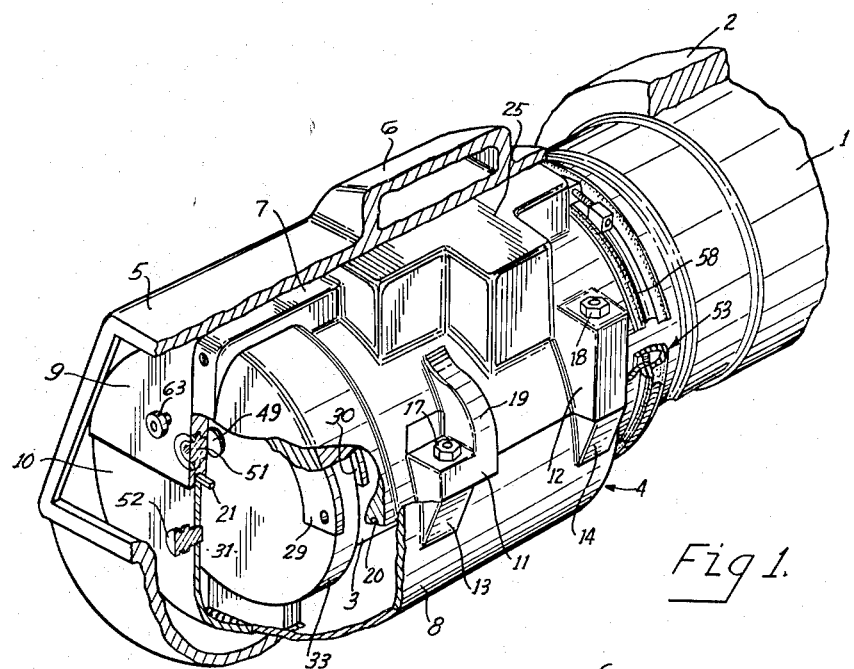
Figure 2:
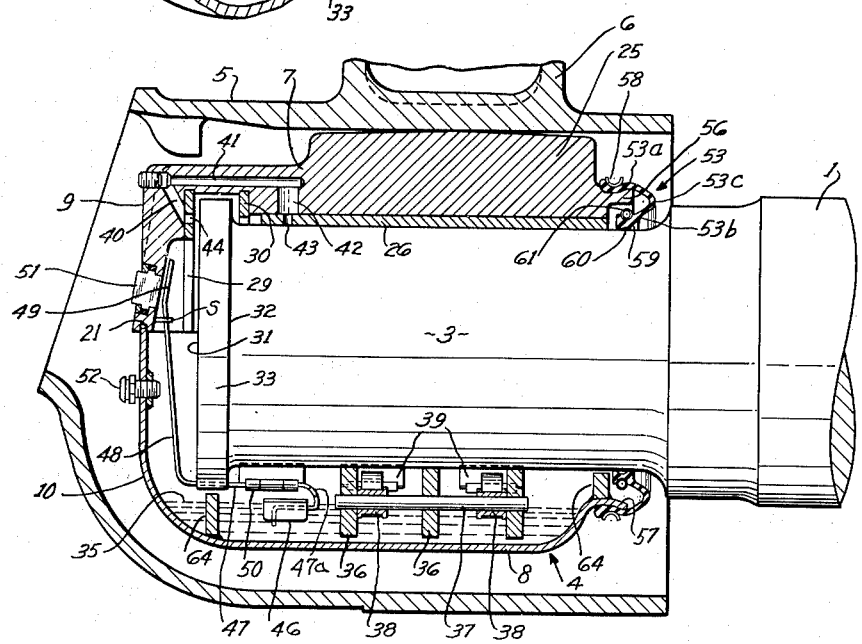
Figure 3:
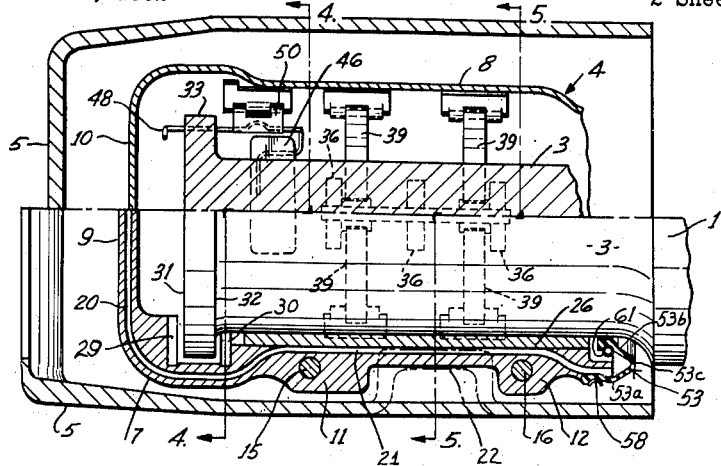
Figure 5:
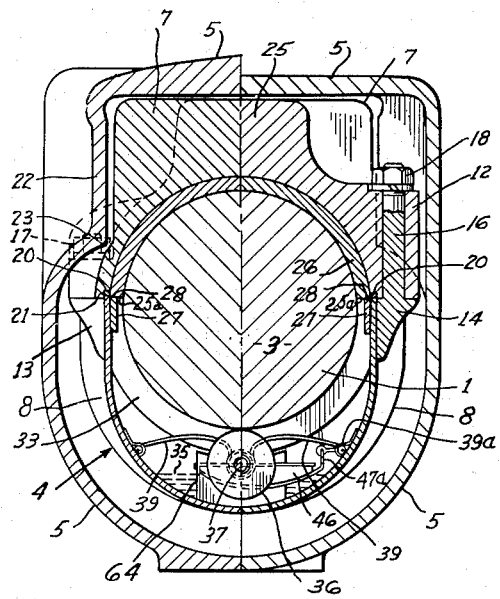
Figure 4:
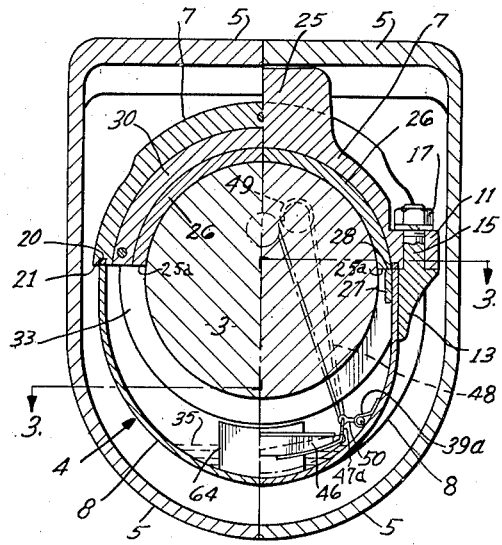

These and other objects of our invention will become apparent from the following description of a preferred embodiment thereof, reference being had to the accompanying drawings in which Figure 1 is a perspective view of a bearing assembly and journal box made according to our invention with portions of each cut away to show the details of construction; Figure 2 is a longitudinal section through the bearing assembly and journal box of Figure 1; Figure 3 is a horizontal section through the bearing assembly and journal box of Figure 1, the section being taken on the line 3—3 of Figure 4; Figure 4 is a vertical section taken on the line 4—4 of Figure 3; and Figure 5 is a vertical section taken on the line 5—5 of Figure 3.

Referring now to the drawings, reference character 1 indicates a conventional railway car axle on which a wheel 2 shown fragmentarily in Figure 1, is conventionally mounted. The axle has journals at its ends, one of them being indicated at 3; journal 3 is mounted in a bearing housing 4 which in turn is disposed within the journal box 5 which is attached to a side frame of a conventional railway car truck or the like, a portion of the side frame being indicated at 6.

The bearing housing 4 completely encloses a substantial portion of the journal and preferably is a substantially cylindrical unit with a closed outer end and an open inner end. The housing preferably is made up of two oppositely facing generally semicylindrical parts or sections, an upper cast section 7 which extends around approximately the upper half of the journal, and a lower section 8, preferably made of drawn sheet metal, which encompasses the rest of the journal and which constitutes an oil pan to retain the lubricating oil for the bearing. The upper and lower sections have end walls 9 and 10, respectively, which, when the sections are assembled, constitute a complete closure for the outer end of the journal.

The upper and lower sections 7 and 8 are secured together as a unit around the journal by means of axially spaced outer and inner bosses 11 and 12, respectively, on each side of the upper section and correspondingly spaced bosses 13 and 14 welded or otherwise secured to the sides of the lower section. As shown in Figures 4 and 5, bosses 13 and 14 have threaded studs 15 and 16, respectively, projecting upwardly therefrom through appropriately drilled holes in the bosses 11 and 12 in the upper section; the studs are engaged by nuts 17 and 18 for drawing the upper and lower sections together. In order to seal the joint between the upper and lower sections against escape of oil, the lower edge of the upper section is preferably formed with a continuous groove 20 into which the upper edge of the lower section fits when the parts are joined. A sealing strip or gasket 21 may be disposed in the continuous groove to seal the joint.

To prevent axial movement of the bearing housing relative to the journal box when these parts are assembled together, the journal box is provided on each side with an inwardly extending projection 22 (see Figures 3 and 5) which fits between and overlies web 19 on outer boss 11, and inner boss 12 on the upper section. Thus the inner bosses 12 and the webs 19, which project a substantial distance from the main body of the upper section 7, are adapted to engage the projections 22 of the journal box 5 and prevent substantial axial displacement of the housing 4 relative to the journal box. The lower section 8 is spaced from the bottom of the housing by a greater distance than the vertical depth of the overlap of projections 22 with the bosses 12 and webs 19. Thus in order to permit the housing to be inserted into or removed from the journal box during assembly or disassembly of the car axles and side frames, each side frame with its journal box may be lifted vertically relative to the bearing housing sufficiently so that the lower edges 23 of the projections 22 will clear the top of the webs 19 on the outer bosses 11. Thereafter the bearing assembly may be slid into or out of the journal box as desired. The inner bosses 12 on the upper section preferably have greater height than the webs 19 so as to engage the projections 22 even when the side frame has been lifted sufficiently to clear the webs 19 and thus limit the depth to which the bearing housing can be inserted into the journal box during assembly of the car axle and the side frame.

The upper section of the bearing housing carries the full load imposed on the side frame. For this reason the upper section has a relatively thick load bearing portion 25 preferably formed in the shape of a cross to save weight otherwise in the corners. When the bearing housing 4 is placed within the journal box, the portion 25 is centered under the connection of the side frame 6 to the journal box 5 as shown in Figure 2, and also is located substantially midway between the ends of the journal 3.

Interposed between the inner surface of the upper section and the top surface of the journal is a replaceable bearing insert 26 having an axial length less than the length of the journal. The bearing insert 26 preferably extends around approximately 170° of the periphery of the journal and has its lower edges 25a chamfered to reduce the tendency of the insert to scrape oil off the journal surfaces. This type of bearing construction provides more bearing area and also makes the bearing more stable by reducing the tendency of the journal to become unseated from the insert as may tend to occur, for example, at the moment of impact when the cars are coupled together. This bearing insert may be composed of standard bearing metal and is held in place within the bore of the upper section 7 by means of axially extending plates 27 secured as by welding to opposite sides of the lower section of the housing. The upper edge surfaces 28 of plates 27 are adapted to abut against the lower edges of the insert and hold the same in place. When the nuts 17, 18 are tightened down on studs 15, 16 to clamp the upper and lower sections together, plates 27 tightly engage and thus hold the bearing insert firmly in place. An alternate form of bearing construction consists of casting a bearing metal facing directly on the inner surface of the upper section; with this type of bearing construction the plates 27 may be omitted.

Axial movement of the journal relative to the bearing housing is limited by two arcuate thrust plates or washers 29 and 30 (Figures 1 and 2) which are pinned or otherwise secured to the inside of upper section 7 adjacent the outer end thereof. When the bearing housing is assembled on the journal the thrust plates are spaced slightly from and overlie the edge portions of the annular faces 31 and 32 of collar 33 on the outer end of journal 3. Thus washers 29 and 30 are adapted to engage these faces of the collar to limit relative axial movement of the journal with respect to the housing 4.

In order to lubricate the bearing, a suitable lubricant such as oil is carried in the oil pan 8, the level of the oil being indicated by dot-dash line 35 in Figure 2. When the axle rotates, oil is transferred from the oil pan directly to the journal by means of a plurality of rollers 36 which are partially immersed in the oil. The rollers are pressed on a shaft 37 so as to rotate with the shaft and with the peripheries of the rollers in engagement with the journal. The shaft 37 is journaled in suitable bearings 38 which in turn are supported by leaf springs 39 secured as indicated at 39a to the sides of the oil pan 8. These springs 39 insure that the rollers will maintain proper contact with the journal and thus effectively transfer adequate quantities of oil to the journal when the axle rotates.

In order to insure proper lubrication of the inner surface of the outer thrust washer 29 we have provided channels 40, 41 and 42 (Figure 2) connected in series in the upper section of the bearing housing; these channels communicate at one end with the crown of a semiannular slot or groove 43 cut in the bearing face and extending 90° to 110° circumferentially over the upper portion of the journal at the other end with an opening 44 in the outer thrust washer 29. Since aperture 43 is located on the bearing in a zone of high pressure, oil will be forced outwardly through the aperture 43, through passages 42, 41 and 40, respectively, in the upper section 7 and finally through the opening 44 in the thrust washer and onto the inner surface thereof. The inner thrust washer 30 is lubricated by the seepage of oil which normally occurs at the end of the main bearing.

In order to permit quick and convenient checking of the level of the oil in the oil pan 8, we provide an oil level indicator shown in Figures 2 and 4 which comprises a float 46 connected to an extension 47 of indicator arm 48 which extends upwardly between the outer face of the journal and the end wall of the bearing housing and carries at its upper end a warning target 49. The extension 47 is supported in a suitable bearing 50 secured to the side of the oil pan. The height of the float 46 in the oil pan is determined by the level of the oil therein; when the oil level drops the indicator extension 47 rotates in its bearing thus shifting indicator arm 48 and the target 49 carried thereby to the left as viewed in Figure 4 to the position shown in dot-dash lines. In this position the target is aligned with and visible from the exterior of the housing through a suitable window 51 in the end wall 9 of the upper section and indicates to the inspector that oil should be added. Replenishment of the oil supply may be effected through a conventional fitting 52 located in the end wall 10 of the oil pan 8. In order to provide for a visual indication of excessive bearing heat, we prefer to secure the float to the indicator arm extension 47 by means of low melting point solder link 47a or the like which will melt when the bearing temperature becomes excessive thus causing the float to drop off and permitting the indicator target to shift in front of the window 51 to show need of service attention for the bearing. A stop pin S, see Figure 2, in the end wall 9 adjacent window 51 prevents further movement of the arm 48, counter-clockwise as viewed in Figure 4, beyond the point where the target 49 is aligned with and visible through window 51.

In order to prevent oil from leaking axially along the journal out of the open inner end of the bearing housing, a resilient rubber or rubber-like sealing ring 53 is mounted circumferentially of and in sealing engagement with the journal at the inner end of the housing. The sealing ring 53 preferably is a continuous substantially U-shaped band having an outer part 53a which engages the housing, an inner part 53b which rides and seals on the journal and a connecting part 53c which connects the two sealing parts together. It will be noted that the outer part 53a of seal 53 engages and seals against the horizontally extending gasket 21, see Figure 3, thus making the seal of the two housing parts 7 and 8 continuous. The sealing ring 53 is sufficiently resilient to allow it to be stretched over collar 33 on the end of the journal during assembly of the parts. As shown in the drawings, the inner end of the upper section 7 of the bearing housing has a rearwardly extending arcuate flange 56, and the adjacent end portion 57 of the lower section 8 of the housing is formed to the shape of a complementary arcuate flange; flanges 56 and 57 are concentric with the journal when the parts are assembled and thus these flanges provide a substantially continuous annular seat on which the sealing part 53a of the ring 53 seats. A metal band 58 similar in form to a hose clamp preferably is clamped around the outer part 53a of the sealing ring to insure a fluid-tight seal between the ring and housing.

The inner part 53b of the sealing ring preferably is somewhat enlarged or thickened at its free end 59 since this portion of the seal bears against the rotatable journal and is therefore subject to the greatest amount of wear. In order to increase the effectiveness of this running seal, the journal contacting surface of the inner part 53b is grooved as at 60 and a garter spring 61 is disposed around the exterior of this part of the sealing ring.

It will be noted that the axial length of the bearing housing preferably is such that the inner ends of the flanges on the upper and lower sections overlie the journal so that the inner part 53b of the sealing ring 53 will ride on the relatively smooth finished journal surface. This insures effective sealing engagement between the contacting surfaces of the sealing ring and axle and promotes longer life for the seal because of the lower peripheral speed of the journal compared to other parts of the axle having a larger diameter. A vent 63 (see Figure 1) is provided in the end wall 9 of the upper section of the housing to permit air to flow into and from the housing and thus prevent build-up within the housing of excessive pressure that might interfere with the normal functioning of the seal 53. The vent 63 has a filter to prevent entrance of dirt into the housing.

Safety support lugs 64, see Figure 2, are secured to the bottom of the oil pan to limit vertical movement of the bearing housing with respect to the journal as might occur during assembly and disassembly of the bearing; such movement, if excessive, might damage the sealing ring and/or the rollers 36.

An important advantage of our improved sealed journal bearing assembly is that only slight modification of existing railroad equipment is necessary to adapt it to accommodate our bearing assembly. For example, with conventional journal boxes it is only necessary to remove the waste retaining ribs from the inside of the boxes and the dust guard portions of the box. Also, when our improved bearing assemblies are employed, the journal box covers may be eliminated since the bearings are already completely sealed; this makes possible more convenient inspection of and access to the bearing units. Furthermore, the advantages of complete and thorough lubrication of the bearing are insured by the structure of our bearing assembly which affords flooded lubrication of the vital parts and thus promotes longer life of the bearing.

It is intended that the patent shall cover by suitable expression in the appended claims whatever features of patentable novelty reside in the invention.

We claim:

1. In a bearing assembly, the combination of an axle having a journal and an end collar adjacent thereto, said end collar having a larger diameter than said journal, a bearing housing surrounding said collar and at least a portion of said journal and being engageable with said collar for limiting axial movement of said housing relative to said journal, said bearing housing having one end closed and the other end open, said bearing housing comprising semi-cylindrical upper and lower sections, means for clamping said clamped sections together, means for sealing said clamped sections, a lubricant carried in the lower section of said housing, means for lubricating the surfaces of said journal with said lubricant when the journal rotates, said sections having aligned semi-annular flanges adjacent the open inner end of the housing, and sealing means for sealing the space between the open end of said housing and said journal comprising a resilient rubber-like ring, said ring being substantially U-shaped in cross section and having one portion in fluid tight engagement with said flanges on said sections and another portion engaging and sealing on the surface of said journal to prevent escape of lubricant axially out of said housing.

2. In a bearing assembly, a journal, a collar at the end of said journal, a bearing housing surrounding a portion of said journal and having one end closed and the other end open, a lubricant carried within said housing, means for lubricating said journal with said lubricant when the journal rotates, means for creating a seal between the open end of said bearing housing and said journal comprising a continuous resilient rubber-like ring having one portion secured to said housing and another portion sealed on the surface of said journal to prevent escape of the lubricant axially out of said housing, a bearing insert between said housing and said journal, an aperture in the crown of said insert, axially spaced bearing washers secured to the upper section on either side of the collar on said journal, said washers being adapted to alternately engage the proximate surfaces of said collar to limit axial movement of said journal relative to said bearing housing, channel means connecting the inner surface of the outer of said washers with said aperture in said insert whereby said lubricant is forced from said journal to said surface on the outer washer when the journal rotates.

3. A bearing assembly for a vehicle having an axle, said axle having a journal at one end thereof being disposed in a journal box, said journal having a collar at the outer end thereof, said assembly comprising a bearing housing surrounding a portion of said journal and disposed within said journal box, said bearing housing having a closed outer end and an open inner end and comprising an upper section and a lower section, means for clamping said sections together, the mating edge of one of said sections having a groove for receiving the edge of the other section and maintaining a fluid tight joint between said sections when joined together, a lubricant carried in the lower section of said housing, a plurality of rollers mounted within said lower section for rotation about an axis parallel to the axis of said journal, means for resiliently pressing said rollers into engagement with the surface of said journal, said rollers being partially immersed in the lubricant in said lower section for transferring said lubricant to said journal to lubricate same when the said vehicle is in motion, means for sealing the space between the inner open end of said bearing housing and said journal comprising a continuous resilient rubber-like ring having one portion sealed against said bearing housing and another portion making fluid tight contact with the surface of said journal to prevent escape of said lubricant axially out of said housing, a bearing insert interposed between said upper section and said journal, axially spaced bearing washers carried by the upper section of the housing on the inner and outer sides, respectively, of said collar on said journal, said washers being adapted to alternately engage the proximate surfaces of the collar whereby to limit axial movement of said journal relative to said bearing housing, means for lubricating the bearing surface of the outer of said washers comprising an aperture in said bearing insert, an opening in said outer washer, and a passageway in said upper section communicating with said aperture and said washer opening whereby lubricant is forced from said journal to said outer washer when said journal rotates.

4. A bearing assembly for a vehicle having an axle, said axle having a journal at one end thereof disposed in a journal box, said journal having a collar at the outer end thereof, said assembly comprising a bearing housing surrounding a portion of said journal and disposed within said journal box, said bearing housing having a closed outer end and an open inner end and comprising an upper section and a lower section, said upper and lower sections having axially spaced bosses, means associated with said bosses for clamping said sections together, said journal box having inwardly extending parts lying between and overlapping said bosses and being adapted to engage same whereby to limit axial movement of said bearing housing relative to said journal box, the mating edge of one of said sections having a groove for receiving the edge of the other section whereby to maintain a fluid tight joint between said sections when the bearing housing is assembled, a lubricant carried in the lower section of said housing, a plurality of rollers mounted within said lower section for rotation about an axis parallel to the axis of said journal, means for resiliently pressing said rollers into engagement with the surface of said journal, said rollers being partially immersed in the lubricant in said lower section for transferring said lubricant to said journal to lubricate the same when said axle is rotating, said upper and lower sections each having aligned axially extending semi-annular flanges at the inner ends thereof, sealing means for sealing the space between the inner open end of said bearing housing relative to said journal comprising a continuous resilient rubber-like ring, said ring being substantially U-shaped in cross section and having one part secured on said flanges and another part making a running seal with the surface of said journal whereby to prevent escape of lubricating fluid axially out of said housing, a bearing insert interposed between the bore of the upper section and said journal, axially spaced bearing washers secured to the upper section on the inner and outer sides of the collar on said journal, said washers being adapted to alternately engage the proximate surfaces of said collar whereby to limit axial movement of said journal relative to said bearing housing, and means for lubricating the bearing surface of the outside washer comprising an aperture in the crown of said bearing insert, an opening in said outer washer, and a passageway in said upper section communicating with said aperture and said washer opening whereby lubricating fluid is forced from said journal to said outer washer when the journal rotates.

5. A bearing assembly for a vehicle with an axle having a journal and a collar at the outer end of the journal, comprising, a bearing housing with a closed outer end and an open inner end and having semi-cylindrical upper and lower sections, means to seal the inner end of said housing against said journal, means for clamping said sections together, a lubricant carried in the lower section of said housing, means for transferring said lubricant to the surfaces of said journal when said axle is rotating, a bearing insert carried on the inside of the upper section adapted to ride on said journal and extending substantially 170 degrees around said journal, axially spaced bearing washers secured to the upper section on the inboard and outboard sides, respectively, of said collar, said washers being adapted to alternately engage the proximate surfaces of said collar to limit axial movement of said journal relative to said bearing housing, and means for lubricating the bearing surface of the outboard washer comprising an aperture in the crown of said bearing insert, an opening in said outboard washer and a passageway in said upper section communicating with said aperture and said washer opening whereby the lubricant is forced from said journal to said outer washer when the vehicle is in motion.

6. A bearing assembly for a vehicle having a journal box and an axle, said axle having a journal at one end thereof disposed in a said journal box, said assembly comprising a bearing housing sealed relative to said journal and disposed within said journal box and comprising substantially semi-cylindrical upper and lower sections, at least one of said sections having axially spaced bosses on opposite sides thereof, and means for clamping said sections together comprising stud means engaging said bosses on said one section and secured to the other of said sections, said journal box having inwardly extending parts lying between and overlapping said bosses adapted to engage said bosses whereby to limit axial movement of said bearing housing relative to said journal box.

7. In a bearing assembly, the combination of an axle having a journal and an end collar adjacent thereto, said end collar having a larger diameter than said journal, a bearing housing surrounding said collar and at least a portion of said journal and being engageable with said collar for limiting axial movement of said housing relative to said journal, said bearing housing having one end closed and the other end open, said bearing housing comprising semi-cylindrical upper and lower sections, means for clamping said sections together, means for sealing said clamped sections, a lubricant carried in the lower section of said housing, axially spaced bearing washers secured to one of said sections on the inboard and outboard sides, respectively, of said collar, means for lubricating the surfaces of said journal and of said washers with said lubricant when the journal rotates, said sections having aligned semi-annular flanges adjacent the open inner end of the housing, and sealing means for sealing the space between the open end of said housing and said journal comprising a resilient rubber-like ring, said ring having one portion in fluid tight engagement with said flanges on said sections and another portion engaging and sealing on the surface of said journal to prevent escape of lubricant axially out of said housing.

References Cited in the file of this patent

UNITED STATES PATENTS

| | | |
|---|---|---|
| 1,358,420 | Dallimore | Nov. 9, 1920 |
| 1,519,072 | Tarlton | Dec. 9, 1924 |
| 1,578,106 | Thornbrugh | Mar. 23, 1926 |
| 1,701,010 | Nystrom | Feb. 5, 1929 |
| 1,741,538 | Richards | Dec. 31, 1929 |
| 1,885,586 | Bryan | Nov. 1, 1932 |
| 1,906,840 | Coady | May 2, 1933 |
| 2,294,105 | Wallgren | Aug. 25, 1942 |
| 2,438,214 | Horger | Mar. 23, 1948 |
| 2,610,097 | Shelden | Sept. 9, 1952 |
| 2,670,998 | Barber | Mar. 2, 1954 |

FOREIGN PATENTS

| | | |
|---|---|---|
| 209,265 | Great Britain | Jan. 10, 1924 |
| 461,985 | Great Britain | Mar. 1, 1937 |
| 256,632 | France | Mar. 1, 1949 |
| 657,692 | Germany | Mar. 10, 1938 |